US008885779B2

(12) United States Patent
Ahuja et al.

(10) Patent No.: US 8,885,779 B2
(45) Date of Patent: Nov. 11, 2014

(54) CHANNEL DETECTOR IMPLEMENTATION WITH POSTCODER

(71) Applicant: Seagate Technology LLC, Cupertino, CA (US)

(72) Inventors: Rishi Ahuja, Longmont, CO (US); Raman Venkataranmani, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/831,185

(22) Filed: Mar. 14, 2013

(65) Prior Publication Data

US 2014/0270013 A1    Sep. 18, 2014

(51) Int. Cl.
*H04L 27/06* (2006.01)
*H04L 1/22* (2006.01)

(52) U.S. Cl.
CPC ........................................ *H04L 1/22* (2013.01)
USPC ........... 375/341; 375/316; 375/340; 714/796; 714/774; 714/780; 714/784; 714/795; 714/794

(58) Field of Classification Search
USPC .......... 375/316, 340, 341; 714/796, 774, 780, 714/784, 795, 794
See application file for complete search history.

(56) References Cited

U.S. PATENT DOCUMENTS

| | | | |
|---|---|---|---|
| 6,445,755 B1 | 9/2002 | Chung et al. | |
| 7,360,147 B2 | 4/2008 | Vasiliev | |
| 7,607,072 B2 | 10/2009 | Ashley et al. | |
| 7,716,564 B2 | 5/2010 | Yen et al. | |
| 7,779,325 B2* | 8/2010 | Song | 714/752 |
| 7,827,464 B2 | 11/2010 | Kuznetsov et al. | |
| 8,307,267 B2* | 11/2012 | Venkataramani et al. | 714/795 |
| 2009/0225878 A1* | 9/2009 | Papadopoulos et al. | 375/260 |
| 2010/0058152 A1* | 3/2010 | Harada | 714/795 |

OTHER PUBLICATIONS

Yeo et al., "Implementation of High Throughput Soft Output Viterbi Decoders", IEEE, 2002, pp. 146-151.
Abdallah et al., Low-Power Pre-Decoding Based Viterbi Decoder for Tail-Biting Convolutional Codes, IEEE, 2009, pp. 185-190.

* cited by examiner

*Primary Examiner* — Siu Lee
(74) *Attorney, Agent, or Firm* — Hollingsworth Davis, LLC

(57) ABSTRACT

A signal detector/decoder is implemented in multiple stages. The beginning stage is configured to input channel data bits and to output hard data bits based on the channel bits and a maximum likelihood (ML) path. The next stage includes a postcoder coupled to receive channel domain information from the first stage and to convert the channel domain information to user domain information. The final stage includes a reliability unit coupled to receive the user domain information from the postcoder and to output user domain soft information for the hard data bits based on the ML path estimation and the user domain information.

20 Claims, 10 Drawing Sheets

CHANNEL DETECTOR IMPLEMENTATION WITH POSTCODER

SUMMARY

Embodiments discussed herein relate to methods, devices, and systems for detecting and/or decoding information.

Some embodiments involve a signal detector and/or decoder implemented in three stages. The first stage is configured to input channel data bits and to output hard data bits based on the channel bits and a maximum likelihood (ML) path. The second stage includes a postcoder coupled to receive channel domain information from the first stage and to convert the channel domain information to user domain information. The third stage includes a reliability unit coupled to receive the user domain information from the postcoder and to output user domain soft information for the hard data bits based on the ML path estimation and the user domain information.

Some embodiments are directed to a communication system. The communication system includes an encoder configured to receive user bits from a host, to encode the user bits and to output encoded user bits. A precoder is configured to convert the encoded user bits to channel bits. A detector is configured to receive the channel bits from a storage medium. The detector includes first, second, and third stages. The first stage is configured to input channel data bits and to output hard data bits based on the channel bits and an ML path estimation through a trellis. The second stage includes a postcoder coupled to receive channel domain information from the first stage and to convert the channel domain information to user domain information. The third stage comprises a reliability unit coupled to receive the user domain information from the postcoder and to output user domain soft information for the hard data bits based on the ML path estimation and the user domain information. The communication system further includes a decoder configured to receive the hard data bits and the soft information, and to decode the hard data bits using the soft information.

Some embodiments involve a communication method. Channel bits are received and are used to determine an ML estimation. Hard data bits are determined based on the ML estimation. Channel domain most likely branches and channel domain path metric differences are determined for states along the most likely path. The channel domain most likely branches are converted to user domain most likely branches. The channel domain path metric differences are converted to user domain path metric differences. Soft information comprising reliability of the hard data bits is determined based on the user domain most likely branches and the user domain path metric differences.

DETAILED DESCRIPTION

A Soft Output Viterbi Algorithm (SOVA) can be used as decoding algorithm for convolution codes in digital communication systems for Maximum Likelihood (ML) path estimation. SOVA detector and/or decoders implement the Viterbi algorithm which finds the most likely path through a trellis that represents a set of states of a finite state machine (FSM). Each node in the trellis represents a state and each edge represents a possible transition between two states at consecutive discrete time intervals. High data rate applications like hard disk drives can implement a custom or semi-custom design of a SOVA detector/decoder (also referred to herein as "SOVA detector/decoder" or "SOVA") to provide hardware area and power consumption within specified limits while meeting data rates exceeding 1 Gb/s range. Other applications can benefit from these designs, including data transfer systems, high speed wireless, and others. For SOVA architectures, implementation of new features in the SOVA detector/decoder can involve significant modification and/or redesign of the SOVA trellis and/or trace back circuitry to maintain the specified limits for hardware area and power consumption.

Embodiments described herein involve an area and power efficient, high speed implementation of programmable postcoder that can be implemented and/or embedded in an existing SOVA design without requiring redesign of the SOVA trellis and trace back circuitry. In various embodiments, the approaches described herein can be applied to half rate or quarter rate SOVA architecture of any radix, such as radix-2 or radix-4 architecture.

Figure 1:
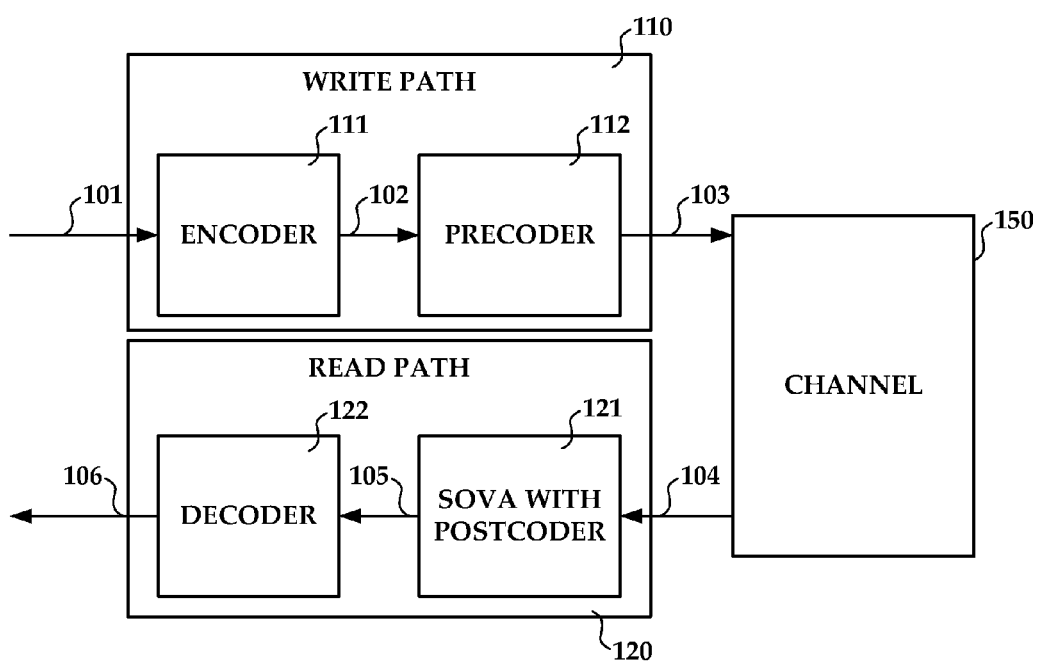
FIG. 1 is a block diagram of a communication channel that includes a soft output Viterbi algorithm (SOVA) detector/decoder with postcoder according to embodiments discussed herein.

With reference now to FIG. 1, data communication can include encoding data 101 sent through a write path 110 to a communication channel 150 and decoding data received from the communication channel 150 through a read path 120. Write and read operations to/from a data storage device, such a hard disk drive or flash drive, may be considered to be transmit and receive operations that occur over a communication channel with data encoding and decoding.

Operations implemented in the write path circuitry 110 convert the user data 101 to channel data 103 before sending the data to the channel 150. Converting the user data to channel data can involve converting the user data into a form that is compatible with the characteristics of the channel medium, including such operations as encoding for error correction, interleaving, bandwidth limiting, amplification and/or other processes. Operations implemented in the read path 120 generally reverse the write path operations. Channel output 104 received from the channel 150 is converted in the read path 120 and is output as user data 106.

The write path 110 may include an encoder 111 implementing inner and outer encoding. For example, the encoder may implement a convolutional code and/or a linear block code, e.g., a low density parity check code (LDPC). In some implementations, the encoder receives user data bits 101, e.g. from a host (not shown in FIG. 1), encodes the user bits using an error correction code (ECC) e.g., such as LDPC, and outputs the user bits 102. In the implementation shown in FIG. 1, a precoder converts the user data bits 102 output from the encoder into channel bits 103. In some cases, the precoder 112 may implement a map comprising a look up table (LUT) to perform the conversion between the user bits and channel bits. The encoded channel bits 103 are sent to the channel 150.

Channel output 104 can be read (received) from the channel 150 and decoded in a read path 120 that includes SOVA detector/decoder 121 and decoder 122. The SOVA 121 and decoder 122 can detect and, in some cases, correct, errors in the data received from the channel 150. A SOVA with postcoder 121 according to embodiments herein converts the channel output 104 from the channel 150 to user bits 105 that are useful to a soft input decoder 122, such as an LDPC decoder. The postcoder 121 performs the inverse operation from the precoder 112. The LDPC decoder is a soft input decoder meaning that it operates on user bits that include reliability (soft) information. The postcoder of the SOVA 121 in the read path 120 reverses the mapping of the precoder 112 in the write path 110. As such, the postcoder may use a look up table (LUT), which is the reverse of the precoder LUT, to map bits from the channel domain to the user domain. The SOVA with postcoder 121 provides estimated data bits (hard data) along with soft information in the user domain to the decoder 122. The operations of the decoder 122 reverses the ECC encoding operations of the encoder 111, providing decoded data bits 106 at the output.

Figure 2:
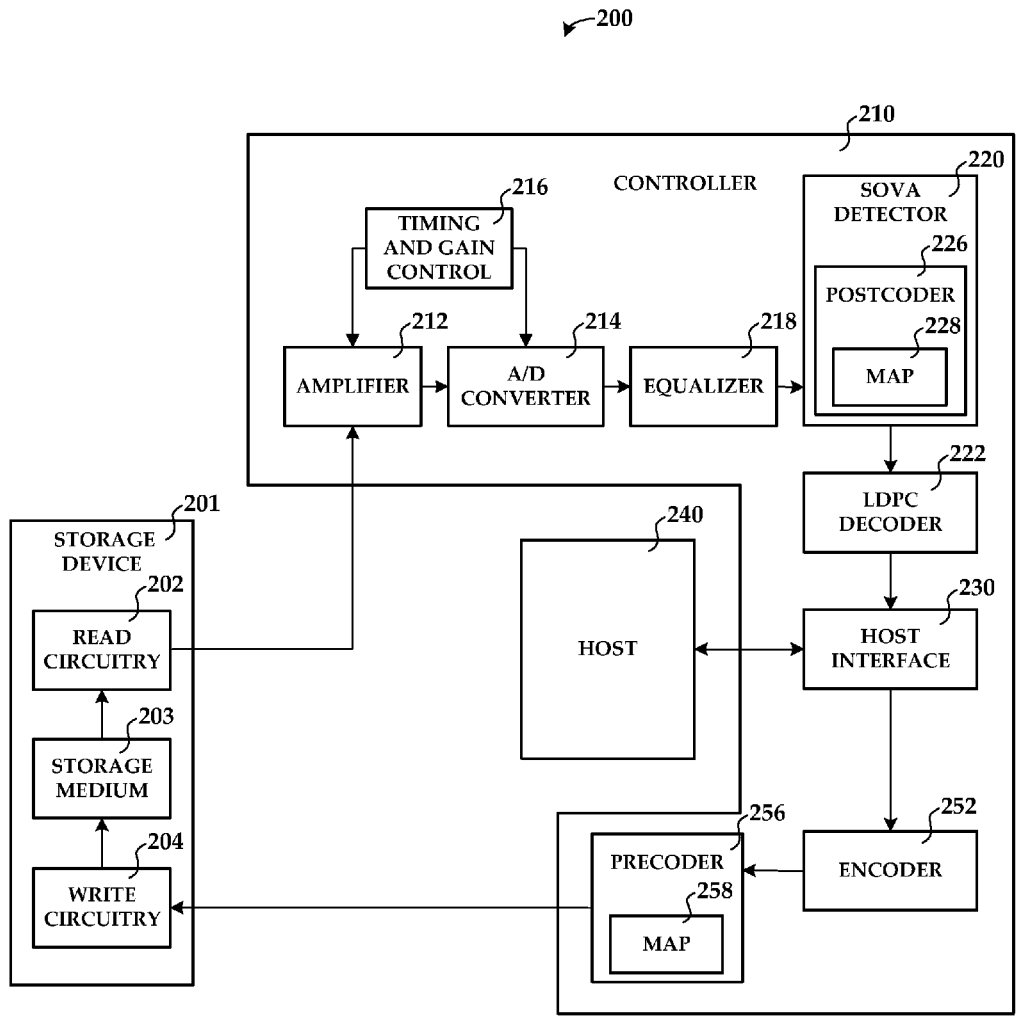
FIG. 2 is a block diagram of a particular illustrative embodiment of a system configured to read data from a channel comprising a storage medium.

FIG. 2 is a block diagram of a particular illustrative embodiment of a communication system 200 that includes a storage device 201 (channel) comprising a storage medium 203, write circuitry 204 configured to write bits to the storage medium 203, and read circuitry 202 configured to read analog output samples from the medium 203. For example, the storage device 201 may be a head-disk assembly that includes a magnetic disk storage medium, a magnetic write head and associated circuitry configured to write magnetic bits to the magnetic disk, and a read head and associated circuitry configured to read magnetic bits from the magnetic disk.

The system 200 includes a controller 210 that implements read and write commands issued by a host 240, wherein write commands request that data is sent to the channel 201 (written to the storage medium 203) to be stored and read commands request that data is read from the storage device 201.

User data from the host to be written to the storage device 201 is received in the controller 210 via a host interface 230. The user data is encoded using an ECC code in an encoder 252, e.g., an LDPC encoder and is sent to a precoder 256 that maps the encoded user bits to channel bits. Mapping the user bits to channel bits is an operation that reduces error detection and/or correction failures due to correlated bit errors in the signal read back from the storage device 201.

In some embodiments, the map 258 between user bits and channel bits may be stored in a look-up table (LUT) that defines a mapping between user bits and channel bits. In another particular embodiment, the map 258 may be a processor adapted to execute instructions that control the programmable precoder 256 to map user bits to channel bits. In another particular example, the map 258 can be implemented as a logic circuit with one or more selectable gates or switches that can be selectively activated to program the precoder 256. In this particular instance, the logic circuit can be implemented without a microprocessor or a look-up table. The encoded channel bits from the precoder 256 are sent to write circuitry and the encoded channel bits are written to the storage device 201.

During a read operation, the output from the storage device read circuitry 202 comprises a readback signal that is provided to the controller 210. In a particular embodiment, the readback signal includes correlated noise, such as inter-symbol interference. The controller 210 includes a variable gain amplifier 212 that is coupled to the storage device read circuitry 202 to receive the readback signal. The variable gain amplifier 212 amplifies the readback signal and provides the readback signal to an analog-to-digital (A/D) converter 214, that samples (digitizes) the readback signal. A timing/gain control circuit 216 is coupled to the variable gain amplifier 212 and to the A/D converter 214 to control the gain of the variable gain amplifier 212 and a sample rate of the A/D converter 214. The output of the A/D converter 214 is provided to an equalizer 218, which is adapted to perform time-domain equalization to filter the digitized readback signal to a pre-selected partial response, maximum likelihood detection (PRML) target waveform, for example. The output of the equalizer 218 is provided to a SOVA detector/decoder with postcoder 220, which converts the readback signal to user bits and provides the recovered user bits to a run-length limited (RLL) and/or error correction code (ECC) decoder 222, such as an LDPC decoder, that provides corrected user bit data. The output of the decoder 222 is coupled to the host system 240 via the host interface 230.

In this example, the SOVA detector/decoder 220 includes a programmable postcoder 226 including a map 228 that defines a mapping between channel bits and user bits. In a particular embodiment, the programmable postcoder 226 may include a look-up table that defines a mapping between channel bits and user bits. In another particular embodiment, the map 228 may be a processor adapted to execute instructions that control the programmable postcoder 226 to map user bits to channel bits. In another particular example, the map 228 can be implemented as a logic circuit with one or more selectable gates or switches that can be selectively activated to program the postcoder 226. In this particular instance, the logic circuit can be implemented without a microprocessor or a look-up table.

The controller 210 includes one or more decoders represented in this example by LDPC decoder 222. In general, the decoders may comprise any type of decoder that configured to receive the coded user bits and their reliabilities from the SOVA detector/decoder 220. In a particular example, the decoder 222 is adapted to calculate a priori reliabilities of the user bits and to supply the a priori reliabilities back to the SOVA detector/decoder 220 to implement an iterative decoding approach.

In a particular embodiment, the SOVA detector/decoder 220 receives a signal affected by correlated noise. In a particular example, the correlated noise is inter-symbol interference (ISI), which is a form of distortion of a signal in which one symbol within a signal interferes with subsequent symbols (i.e., neighboring symbols). In general, ISI has a similar effect as noise, making readback data less reliable. The SOVA detector/decoder 220 uses the postcoder 226 to reduce a raw bit error rate of the channel by reducing the number of errors (frequency of errors) associated with typical error events. In a particular example, the programmable postcoder 226 is adapted to map user bits from the received signal to channel bits using a look up table. The map 228 in the postcoder is used to reverse the mapping performed by the precoder 256. The channel bits and user bits are provided to the SOVA detector/decoder 220 which makes hard bit decisions related to the mapped user bits and provides bit-level reliability data (such as log-likelihood ratios (LLRs)). The SOVA detector/decoder 220 is adapted to compute reliabilities associated with the mapped bits from the programmable postcoder 226.

In a particular example, the map 258, 228 may include multiple look-up tables (LUTs), which may include data related to particular operating conditions associated with an electronic device. For example, the programmable precoder 256 and/or programmable postcoder 226 may include selection logic to allow the programmable precoder and/or postcoder 256, 226 to select a particular map, e.g., LUT, of a plurality of programmable maps (LUTs) based on one or more operating conditions of the electronic device. For example, the channel characteristics of a magnetic recording system, such as a disk drive, can be dependent on the radial distance of the data track from the center of a rotating disk. In a particular example, the precoder 256 and/or postcoder 226 shown in FIG. 2 may include logic that is adapted to select a particular map 258, 228 from a plurality of maps based on a radial distance of the data track from the center of the disc. By selecting a desired map based on the operating condition, the programmable precoder 256 and/or postcoder 226 can use operating conditions to tune its own performance. Moreover, in a particular example, the radial distance could be used to adaptively program the map 258, 228 for use with the programmable precoder 256 and/or programmable postcoder 226 of the SOVA detector/decoder 220. In a particular example, each read/write head of a multi-platter disc drive may have an associated map, e.g., LUT. The programmable precoder 256 may map user bits to channel bits and the programmable postcoder 226 may map channel bits to user bits using a selected LUT that is associated with the particular read/write head. In a particular embodiment, the programmable precoder 256 and/or postcoder 226 is a non-polynomial precoder/postcoder, which can be represented in terms of a look-up table.

Figure 3:
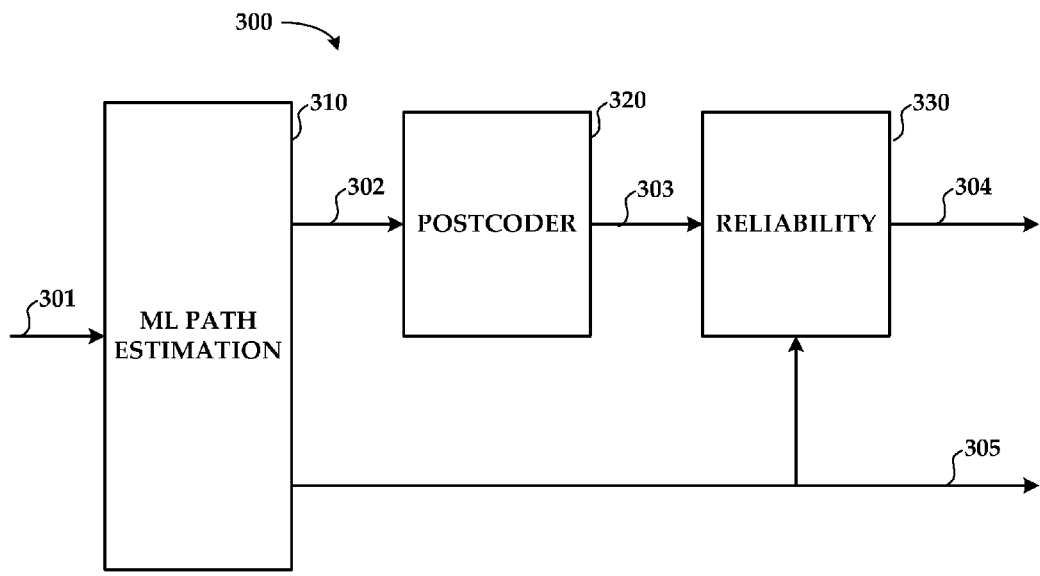
FIG. 3 is a block diagram of a SOVA detector/decoder with a postcoder according to various embodiments.
Figure 4:
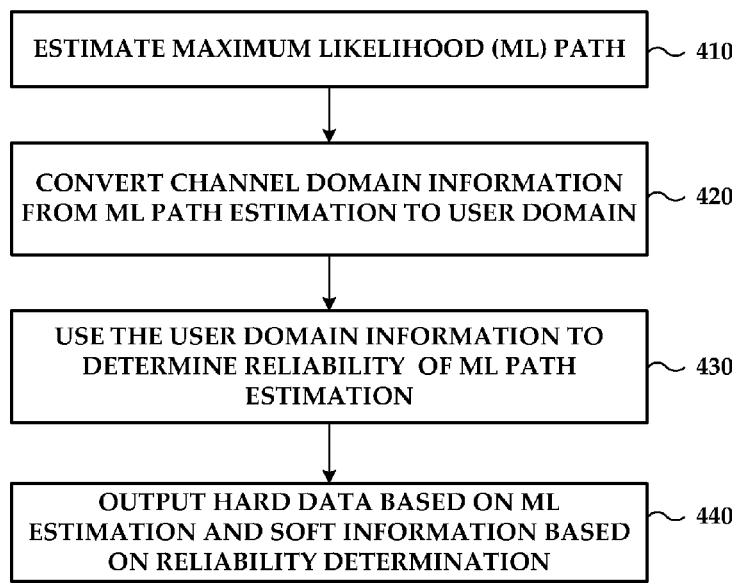
FIG. 4 is a flow diagram illustrating processes implemented by the SOVA of FIG. 3.

FIG. 3 is a block diagram of a SOVA detector/decoder 300 with a postcoder according to various embodiments. The operation of the SOVA 300 is discussed now with reference to the block diagram of FIG. 3 and the process flow diagram of FIG. 4. In this example, the SOVA detector/decoder 300 includes three stages—the first stage 310 operates on a trellis of length L and is configured to estimate 410 the ML path based on channel output samples 301 received at the input of the first stage 310. The first stage 310 passes information 302 about the ML path estimation in the channel domain to the second stage 320. The information 302 includes most likely branch decisions and path metric differences. The second stage 320 comprises a postcoder which operates on a trellis of length GP. The postcoder 320 converts 420 the channel domain information 302 received from the first stage 310 to the user domain. For example, the postcoder 320 may use a look up table of length GP to convert the channel bit labels of the most likely branches and path metric differences received from the first stage 310 to user bit labels. The postcoder 320 passes the user domain information 303, e.g., the user-bit-labeled most likely branches and path metrics to the third stage 330. The third stage uses the ML path estimation 305 determined by the first stage 310 and the user domain information 303 received from the postcoder 320 and traces a path through an M stage trellis to determine 430 the reliability of the ML path estimation. The SOVA detector/decoder 300 outputs 440 hard data 305 that corresponds to the ML path estimation and soft information 304 that provides the reliability of the hard data 305. The total latency of the SOVA detector/decoder 300 is L+GP+M.

As discussed herein, a SOVA detector/decoder operates in three stages and implements a postcoder to map channel bits to user bits. A first stage of the SOVA detector/decoder receives channel bits and operates on a trellis of length L of states N to provide a ML path estimation that corresponds to hard data output from the SOVA detector/decoder. The L-stage trellis of states N is used to perform Viterbi operations to estimate Maximum Likelihood (ML) path, where the length L is chosen to be sufficiently large so that the ML path terminates at state m(L). The high speed trace-back implementation is achieved by updating the ML path continuously in a pipelined fashion based on the output of the ACS (Add compare select). The ACS unit generates path decisions along with path metrics differences. The decisions and the metric differences are stored into L-step FIFOs, and the delayed decisions are postcoded in a second GP-length second stage. The postcoded decisions and path metric differences are used in an M-length register exchange path equivalence detector (REAEQ) to determine the reliability for ML path. A register exchange architecture may be implemented using a two-dimensional array of 1-bit registers and multiplexers. The connection between registers mimics a trellis used to decode the convolutional code. The registers are controlled by a clock signal that has a frequency equal to the throughput of the Viterbi decoder.

Figure 5:
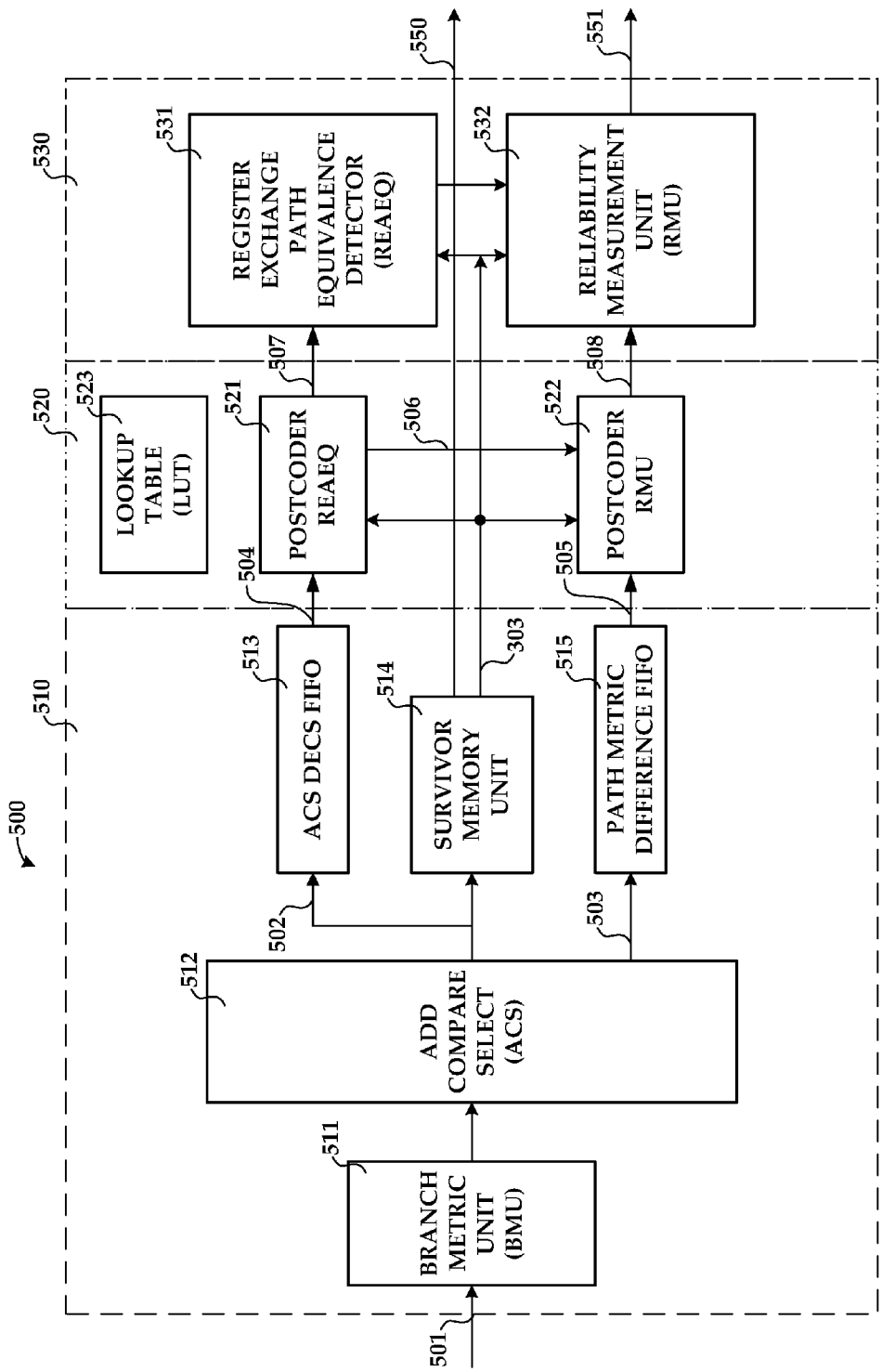
FIG. 5 is a block diagram of a register exchange SOVA with postcoder according to various embodiments.

Turning now to the block diagram of FIG. 5, the first stage 510 of a SOVA detector/decoder 500 includes a Branch Metric Unit (BMU) 511 that receives the input data 501 from the channel and computes a metric (e.g., the Euclidean distance for soft decoding) for each state and input combination along the L-step trellis. The Add Compare Select (ACS) 512 unit adds the current metric received from the BMU 511 to the accumulated metric for each path and determines the least path metric for each state of the trellis. The ACS 512 recursively accumulates the branch metrics as path metrics (PM), compares the incoming path metrics, and selects the most likely branches for each state of the trellis. The ACS 512 outputs the most likely branch decisions (acs_decs) 502 to an L-stage Add Compare Select Decision First In First Out Register (ACS DECS FIFO) 513 and to an L-stage Survivor Memory Unit. The acs_decs 502 represents the survivor path for each state. As the data exceeds a certain amount, all the survivor paths converge to a correct solution. The amount of data is referred to as a decoding length. The survivor memory unit (SMU) 514 stores the survivor path to perform decoding after the decoding length (L) is reached and outputs hard data 550 corresponding to the ML path. The ACS 512 also outputs the results of the path metric difference calculations 503 to an L-stage path metric difference FIFO (PMD FIFO) 515.

The first stage 510 passes the (channel domain) most likely branch decisions from the ACS DECS FIFO 513 and the (channel domain) path metric differences from the PMD FIFO 515 to the second stage 520 along paths 504 and 505, respectively. The second stage comprises a postcoder including a GP-length register exchange path equivalence detector (postcoder REAEQ) 521 and postcoder reliability memory unit (postcoder RMU) 522 that are designed to implement the postcoding operations for SOVA detector/decoder 500. To implement the postcoding operations (converting channel bits to user bits), the postcoder 520 includes a look up table 523 of length GP, e.g., GP=3 or 4. The delayed decisions from the L-stage ACS DECS FIFO 513 are used by the postcoder REAEQ 521 to determine the similarity between each pair of competing decisions. The delayed metric difference output 505 from the L-stage PMD FIFO 515 and the output 506 of the postcoder REAEQ 521 corresponding to the most-likelihood state based of the postcoded bits are used in the postcoder RMU 522 to compute the reliability for the ML path.

The postcoder REAEQ 521 and postcoder RMU 522 output their respective postcoded (user domain) information along paths 507, 508, respectively, to the third stage 530 of the SOVA detector/decoder 500. The third stage 530 includes a register exchange path equivalence detector (REAEQ) 531 that receives the postcoded output 507 from the postcoder REAEQ 521 and a reliability measurement unit (RMU) 532 that receives the postcoded output 508 from the postcoder RMU 522. The third stage 530 of the SOVA detector/decoder operates on a trellis of length M for states N to update the reliability of the ML path. The third stage 530 of the SOVA detector/decoder 500 operates on the postcoded user domain information and uses the REAEQ 531 to determine the equivalence between each pair of competing decisions obtained through an M-step traceback from nodes along the ML path to determine a next most likely path. The RMU 532 operates on the postcoded reliability information 508 from the postcoder RMU 522 to determine the minimum difference in competing path metrics. In other words, the delayed decisions from the ACS DECS FIFO 513 which are postcoded by the postcoder REAEQ 521 and postcoder RMU are used in the M-step REAEQ 531 and RMU 532 to determine the reliability for ML path. The SOVA detector/decoder 500 outputs hard data 550 corresponding to the ML path from the survivor memory unit 514 and the reliability data (soft information) 551.

According to the implementation of FIG. 5, the second stage GP length postcoder REAEQ 521 and postcoder RMU 522 are designed as a subset of the third stage M-length REAEQ 531 and RMU 532 with an addition of the programmable LUT 523. The hardware for the SOVA detector/decoder 500 can be implemented using a multiplexer to support half rate (2 bits per clock period) or quarter rate (4 bits per clock period) architecture implementations. The tables of the postcoder LUT 523 are accessed only when a block of length GP is available from L-stage decision FIFOs 513, 515. The postcoder REAEQ 521 and postcoder RMU 522 are instantiated a register exchange SOVA data path such that the output latency of the SOVA is L+GP+M.

Figure 6:
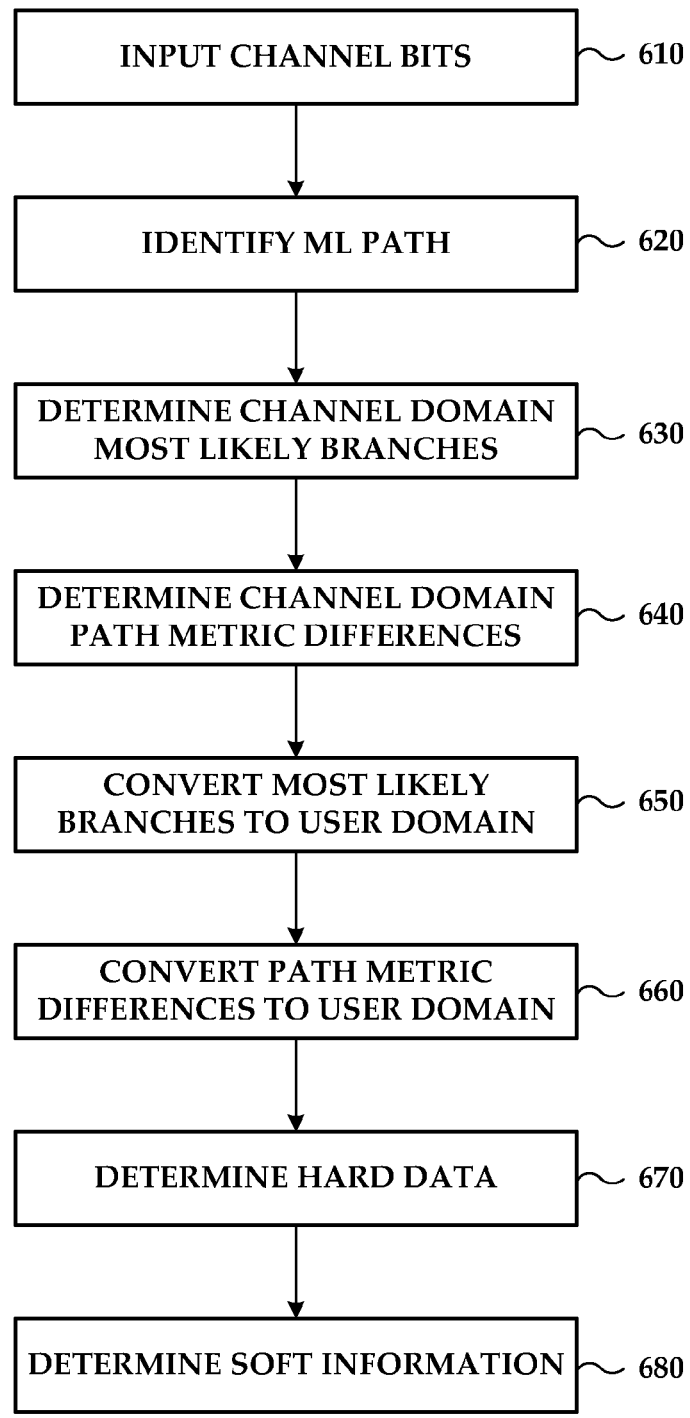
FIG. 6 is a flow diagram illustrating processes implemented by the SOVA of FIG. 5.

FIG. 6 is a process flow diagram for operation of a SOVA detector/decoder according to various embodiments. The SOVA detector/decoder receives 610 input channel bits from the channel and operates on the channel bits to determine 620 a ML path. In the process of determining the ML path, the SOVA detector/decoder identifies 630, 640 most likely branches and path metric differences that are expressed in the channel domain. The SOVA detector/decoder operates a postcoder that converts 650 the channel domain most likely branches to the user domain most likely branches and converts 660 the channel domain path metric differences to user domain most likely differences. The SOVA detector/decoder outputs 670 hard data the represents the ML path. The SOVA detector/decoder determines 680 and outputs the reliability of the hard data (soft information) based on the ML path information and the postcoded (user domain) most likely branches and postcoded (user domain) path metric differences.

To illustrate the SOVA architecture implementation, consider an example inter-symbol-interference (ISI) channel given by:

$$y_n = 3x_n + x_{n-1} - x_{n-2} + w_n$$

where $x_n \in \{0,1\}$ are channel input bits, $y_n$ is the channel output, and $w_n$ is additive white Gaussian noise of variance $\sigma_w^2 = 1$. This is a partial response channel with memory $\mu=2$ and the ISI filter $h=\{2,1,1\}$. Therefore, a radix-2 SOVA is implementable using $2^\mu = 4$ states. Let $S_n = (x_{n-1}, x_n)$ denote the trellis state at time n consisting of two channel bits $x_{n-1}$ and $x_n$. The trellis branch at time n connects states $S_{n-1}$ and $S_n$ and hence is represented by a triplet $B_n = (S_{n-1}, S_n) = (x_{n-2}, x_{n-1}, x_n)$. The branch metric for the transition from state $S_{n-1}$ to $S_n$ is given by $\gamma_n(S_{n-1}, S_n) = \log(P(y_n | S_n, S_{n-1}))$ where $P(y_n | S_n, S_{n-1})$ is the conditional probability density function (PDF) of the channel output sample. For the specific example, it is a Gaussian distribution which results in $$\gamma_n(S_{n-1}, S_n) = \frac{1}{2}|y_n - 2x_n - x_{n-1} + x_{n+2}|^2.$$

The Viterbi state sequence is the one that minimizes the total path metric:

$$\Sigma n \, \gamma n(S_{n-1}, S_n).$$

In this example, the trellis supports a maximum GP size equal to the number or bits on the trellis branch which is 3. Suppose that we use the memoryless GP of size 3 whole precoder/postcoder look up table specified by the mapping shown in Table 1. The precoder maps user bits denoted by $\{a_n\}$ to channel bits $\{x_n\}$ by applying the mapping in the table to a triplet of user bits at a time. Specifically the precoder maps $(a_0, a_1, a_2) \rightarrow (x_0, x_1, x_2)$, followed by $(a_3, a_4, a_5) \rightarrow (x_3, x_4, x_5)$ and so on. Thus, the precoder is only active at time instances n=3k+2 for integer values of k when it has received a new triplet of bits to map to channel bits.

TABLE 1

Precoder/Postcoder Mapping Tables for a size 3 GP

| User bits (postcoded domain) $(a_{3k}, a_{3k+1}, a_{3k+2})$ | Channel bits (precoded domain) $(x_{3k}, x_{3k+1}, x_{3k+2})$ |
| --- | --- |
| 000 | 000 |
| 001 | 001 |
| 010 | 011 |
| 011 | 101 |
| 100 | 010 |
| 101 | 111 |
| 110 | 110 |
| 111 | 100 |

Figure 7:
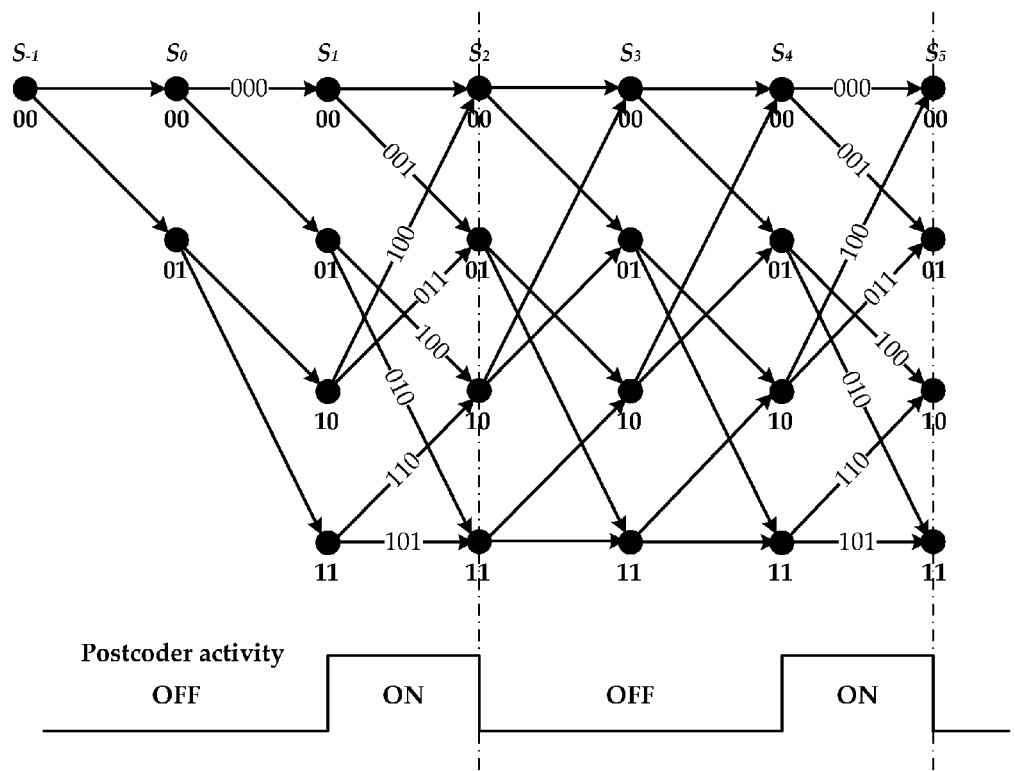
FIG. 7 illustrates a SOVA trellis for the first six time samples showing two postcoder events in accordance with an embodiment discussed herein.

FIG. 7 shows the SOVA trellis diagram for the first 6 time samples (n=0, ..., 5) starting from the initial state $S_{-1}=0$. The states are shown as red nodes with the state labels $S_n=(x_{n-1}, x_n)$ shown underneath each state. Like the precoder, the postcoder is active only at time instants n=3k+2 when it has received a new triplet of bits that can be mapped back to the channel domain. The triplet is simply the branch label at that time instant, i.e., $B_{3k+2}=(x_{3k}, x_{3k+1}, x_{3k+2})$. The user bits, obtained by applying the postcoder mapping to the channel bits, are shown as blue labels on the trellis branches at the active postcoder cycles.

Consider a user bit sequence starting with the six bits $a=\{1,0,1,0,0,1,...\}$ that is precoded and sent through the channel. The precoded bits are obtained by mapping the user bits triplet-by-triplet using the mapping in Table 1. So, the first user bit triplet 101 is mapped to the channel bit triplet 111, the second user bit triplet 001 is mapped to channel bits 001, and so on. This results in the channel bit sequence $x=\{1,1,1,0,0,1,...\}$ which is then transmitted through the ISI channel. Assume that the channel bits are $x_n=0$ for n<0 so that the initial trellis state is set to $S_{-1}=0$ as shown in FIG. 7. Thus, the ideal (noise free) channel output is $y_0=\{3,4,3,0,-1,3,...\}$ and a typical noisy channel output $\{y_n: n \geq 0\}$ might be:

$$y=\{3.39598, 7.35890, 1.92408, 0.51572, -1.30060, 1.76358, ...\}.$$

The assumption that all paths originate at state $S_{-1}=0$ in the SOVA is equivalent to assigning an initial state metric of 0 to the $S_{-1}=0$ and an infinite or a very large metric to all other states $S_{-1} \neq 0$. This example is used to illustrate the workings of the SOVA and postcoding for two GP blocks (over 6 clock cycles).

Stage 1

In the first stage of the register exchange implementation the branch metric for each transition $\gamma_n(S_{n-1}, S_n)$ at time n is computed and added to the old state $\sigma_{n-1}(S_{n-1})$ metric to yield a path metric:

$$P(S_{n-1}, S_n) = \sigma_{n-1}(S_{n-1}) + \Gamma_n(S_{n-1}, S_n).$$

This quantity represents the metric associated with the best path in the trellis starting from initial state and ending on the transition $B_n = (S_{n-1}, S_n)$. The new state metric is the minimum of all path metrics ending at state $S_n$. From FIG. 7 it is clear that paths begin to merge only at time n=2. Table 2 below shows the path metric differences (PMD) and the ACS decisions at each state $S_n$ for n≥2. The first stage of the implementation stores precisely these PMDs and ACS decisions in a FIFO buffer of length L. The ACS decisions contain all the information needed to trace back the winning path at a given state. If the latency L is sufficiently large, all the winning paths from all the states will have merged with a high probability. Thus, at the end of the FIFO buffer, the Viterbi state $\hat{S}_{n-L}$ with a high level of confidence has been determined.

TABLE 2

PMDs and ACS decisions in parentheses at each state for n ≥ 2.

| Time n | 00 | 01 | 11 | 10 |
|---|---|---|---|---|
| 2 | 10.1227(1) | 13.1227(1) | 8.1227(1) | 11.1227(1) |
| 3 | 15.9851(1) | 18.9851(1) | 13.9851(1) | 16.9851(1) |
| 4 | 3.0886(1) | 6.0886(1) | 1.0886(1) | 4.0886(1) |
| 5 | 6.0170(0) | 3.0170(0) | 8.0170(0) | 5.0170(0) |

Table 3 below shows the state metric at each state for the first six clock cycles. The minimum entry in each row would indicate the winning state based on the information processed thus far. However it may not be the true Viterbi state until we process further output samples and trace back. In this particular example state $S_5=01$ has the least metric (shown in bold). Assume that Stage 1 does yield $\hat{S}_5=01$ as the Viterbi state after an L step traceback. It can be verified using the ACS decisions that the first six detected channel bits are $\hat{x}=\{1,1,1,0,0,1\}$, i.e., the first six bits are error free. The corresponding user bit decisions are also error free.

TABLE 3

State metric at each state for the first 6 clock cycles

| Time n | $\sigma_n(00)$ | $\sigma_n(01)$ | $\sigma_n(10)$ | $\sigma_n(11)$ |
|---|---|---|---|---|
| 0 | 5.766324 | 0.078398 | Infinity | Infinity |
| 1 | 32.843034 | 15.266332 | 20.296207 | 5.719505 |
| 2 | 24.571340 | 20.299089 | 7.570554 | 6.298303 |
| 3 | 8.719258 | 8.672097 | 6.431287 | 9.384126 |
| 4 | 6.476468 | 11.878281 | 10.229911 | 18.631724 |
| 5 | 8.031581 | 7.240832 | 12.169811 | 14.379062 |

Stage 2

The goal of the stage 2 block is to compute the reliabilities of the user bits based on the PMDs computed by stage 1. The reliability of a user bit $a_n$ is defined as its log likelihood ratio given the channel output y $$L_k = \log \frac{P(a_k = 1 \mid y)}{P(a_k = 0 \mid y)}$$

Let $\hat{S}_n$ denote the Viterbi state at time n that is determined by stage 1 that is operating on trellis segment that is L cycles ahead of stage 2, i.e., at time n+L. Let $\Delta_n(\hat{S}_n)$ denote the PMD at the Viterbi state obtained from the FIFO buffer. Also let $\{\hat{a}_k^W(\hat{S}_n)\}$ and $\{\hat{a}_k^L(\hat{S}_n)\}$ denote the winning (survivor) and losing user bit decision at the Viterbi state. Again, this information is available by means of the ACS decisions stored in the FIFO buffer. Then, at time n, the LLR of all the previously postcoded user bits $a_k$ are updated as follows $$L_k \leftarrow \begin{cases} \min(L_k, \Delta_n(\hat{S}_n)) & \text{if } \hat{a}_k^W(\hat{S}_n) \neq \hat{a}_k^W(\hat{S}_n) \\ L_k & \text{otherwise} \end{cases}.$$

Furthermore, if n is an active postcoder cycle, the newly postcoded user bits in that clock cycle are assigned LLRs equal as follows $$L_k \leftarrow \begin{cases} \Delta_n(\hat{S}_n) & \text{if } \hat{a}_k^W(\hat{S}_n) \neq \hat{a}_k^W(\hat{S}_n) \\ \infty & \text{otherwise} \end{cases}$$

Figure 8:
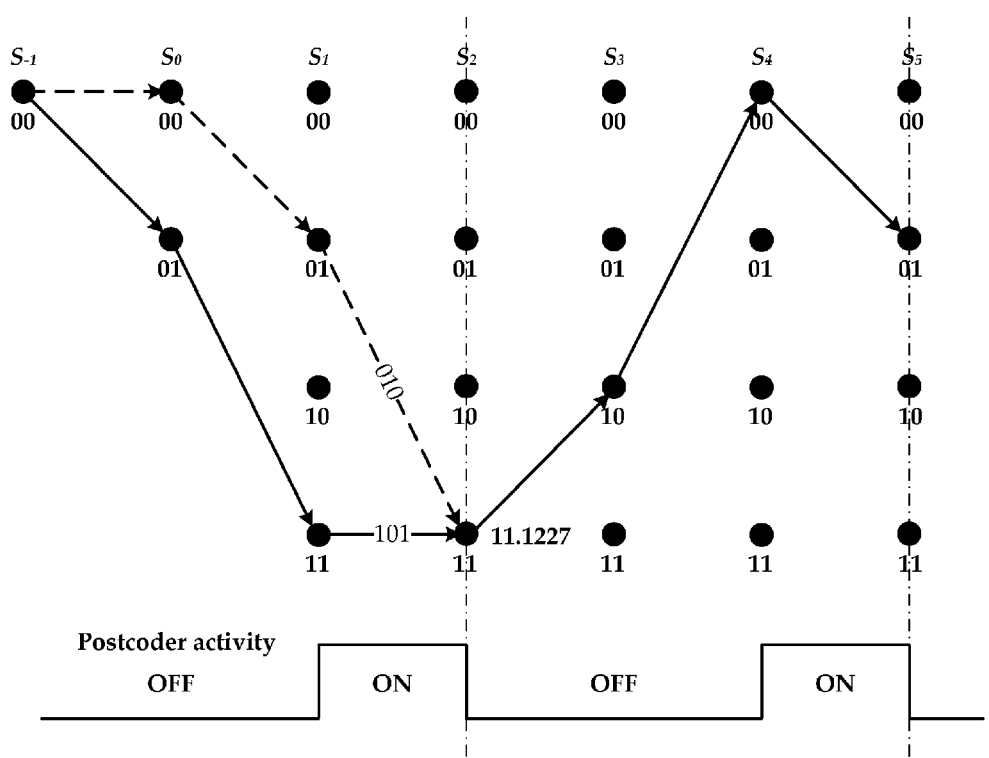
FIGS. 8-11 illustrate the SOVA trellis and computation of user bit reliabilities at n=2, n=3, n=4, and n=5, respectively, in accordance with an embodiment discussed herein.

Consider how the reliabilities (LLRs) of the user decisions are computed and updated by the second stage block. Assume that the first stage was successful in identifying the Viterbi state correctly and providing the winning state index to the second stage. The first instance that reliabilities of user bits can be established is at the first active postcode cycle at n=2. FIG. 8 illustrates the computation of user bit reliabilities at n=2. FIG. 8 shows the Viterbi path as a solid line, the Viterbi state $\hat{S}_2=11$ and the losing path as a dotted line. This information is provided by ACS decisions (Table 2) that were computed by the first stage and stored in the FIFO buffer. In this clock cycle, the postcoder is applied to the channel bits on both the winning and losing branches entering the state $\hat{S}_2=11$. From FIG. 8, it is clear that the winning path has the user bit label $\{a_0, a_1, a_2\} = \{1,0,1\}$ while the losing path has the label $\{a_0, a_1, a_2\} = \{0,1,0\}$. The PMD at this state is $\Delta=11.1227$ (from Table 2). The equivalence detector compares the user bit decision on the winning and losing paths and tells the RMU which decision bits on the winning path are different from the same bits on the losing path. The RMU assigns the PMD value as the LLRs for all user bits that are different on the two paths. In this example, all three bits are different on the losing path compared to the Viterbi decisions. Hence, the first three user bit hard decisions and LLRs are set as follows: $(\hat{a}_0, \hat{a}_1, \hat{a}_2) = (1,0,1)$ with LLRs:

$$(L_0, L_1, L_2) = (11.1227, 11.1227, 1.1227).$$

Figure 9:
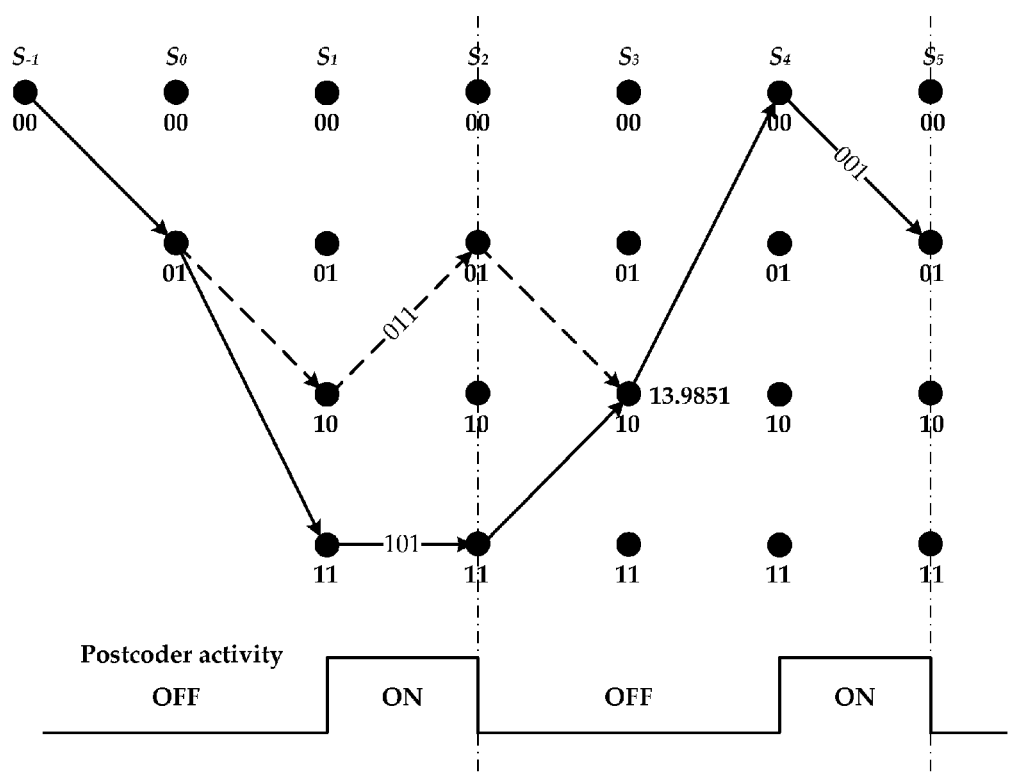

The next time index n=3 in the trellis is illustrated in FIG. 9. This time, the Viterbi state is $\hat{S}_3=10$ and the solid and dotted paths are the winning and losing paths at this state. The PMD and ACS decisions are obtained from the FIFO buffers (Table 2). This is an idle cycle for the postcoder but the equivalence detector and RMU still need to update the LLRs of previously postcoded user bits. This time, the first three user bits on the losing path are $\{a_0, a_1, a_2\} = \{0,1,1\}$, while the same bits on the winning path are $\{a_0, a_1, a_2\} = \{1,0,1\}$. Thus, the path equivalence detector reports that $a_0$ and $a_1$ are different. The LLR of $a_2$ remains unchanged, but those of $a_0$ and $a_1$ are updated as $$L_i \leftarrow \min(L_i, \Delta),$$

for i=0,2 where $\Delta=13.9851$ is the relevant PMD at $\hat{S}_3=10$. This leaves the reliabilities unchanged in this example.

Figure 10:
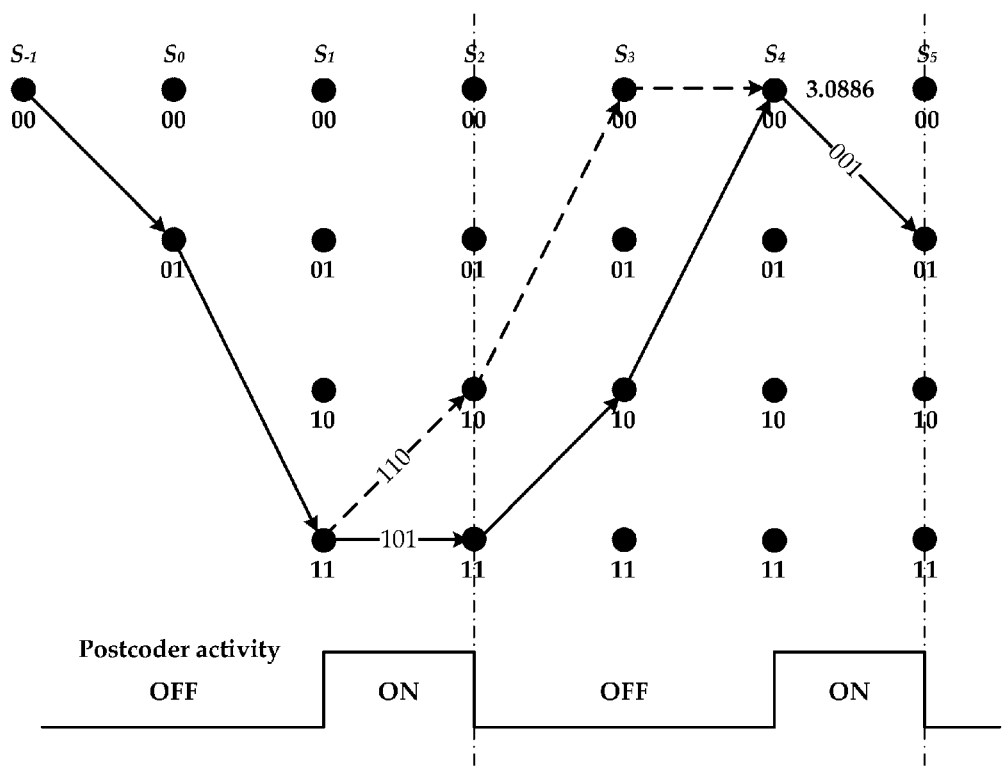

FIG. 10 shows the next time instant n=4 where $\hat{S}_4=00$ is the Viterbi state with a PMD of 3.0886 (from Table 2). Again, there is an idle postcode cycle, but the RMU updates the LLRs of the previously postcoded bits. This time $(a_0, a_1, a_2)=(1,1,0)$ on the losing path and (1,1,0) on the winning path. Thus the LLRs $L_2$ and $L_3$ are updated as $L_i \leftarrow \min(L_i, \Delta)$ for i=2,3 where $\Delta=3.0886$. This results in the new LLRs:

$$(L_1, L_2, L_3) = (11.1227, 3.0886, 3.0886).$$

Figure 11:
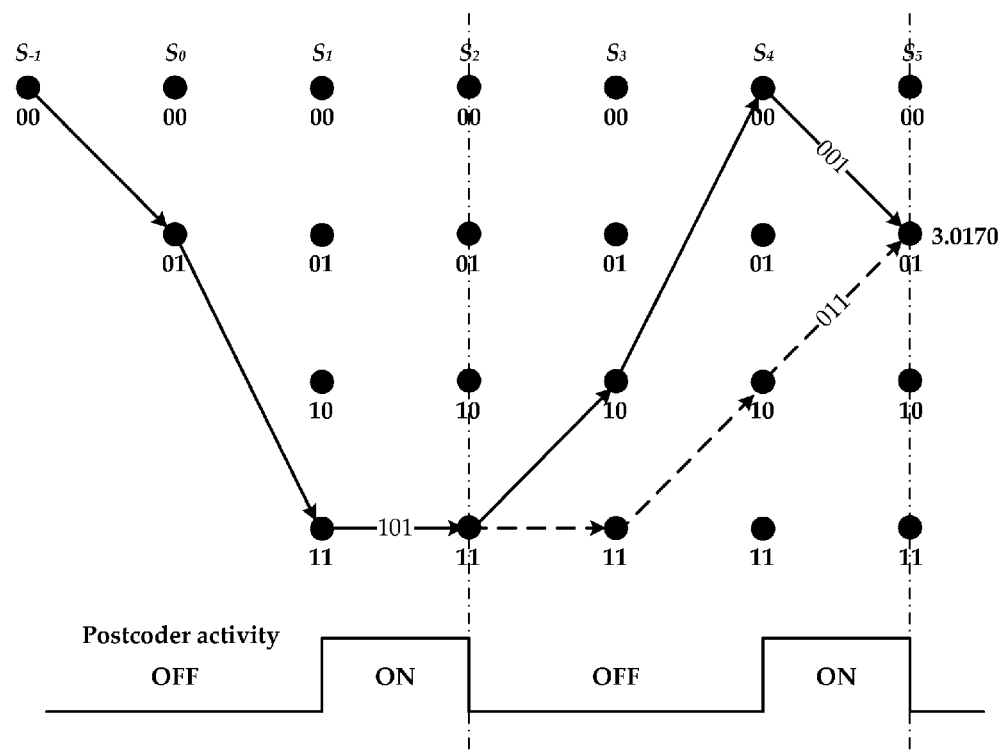

At n=5 (see FIG. 11), $\hat{S}_5=01$ is the Viterbi state with a PMD of $\Delta=3.0170$. There is an active postcode cycle again and the newest channel bits are postcoded on the Viterbi path to a user bit triplet $(a_3, a_4, a_5)=(0,0,1)$. The same user bits on the losing path are (0,0,1). In this case, only $a_4$ is different on the two paths. So we set $L_3=L_5=\infty$ and $L_4=\Delta=3.0170$. Since the user bits $(a_0, a_1, a_2)$ are identical on the winning and losing paths due to the fact that the paths have merged their LLRs need no further updating. In this example, we see that $L_3$ and $L_5$ temporarily have infinite reliabilities, These infinite reliabilities will likely become finite after future updates. The process continues for each increasing index n with the RMU assigning LLRs to newly postcoded bits (in active postcoder cycles) and updating previously postcoded user bits (in all clock cycles).

Embodiments discussed herein relate to methods, devices, and systems for detecting and/or decoding information. In some embodiments, a signal detector/decoder is implemented in three stages. The first stage is configured to input channel data bits and to output hard data bits based on the channel bits and a maximum likelihood (ML) path. The second stage includes a postcoder coupled to receive channel domain information from the first stage and to convert the channel domain information to user domain information. The third stage includes a reliability unit coupled to receive the user domain information from the postcoder and to output user domain soft information for the hard data bits based on the ML path estimation and the user domain information.

The first stage operates on a trellis of length L, the second stage operates on a trellis of length GP, and the third stage operates on a trellis of M. The total latency of the detector/decoder is L+GP+M.

According to some embodiments, the postcoder is a non-polynomial postcoder. According to some aspects, the postcoder includes one or more programmable look up tables (LUTs). Each LUT stores a map between channel bits in the channel domain and user bits in the user domain. In some implementations, the one or more LUTs comprise a plurality of LUTs. Each LUT of the plurality of LUTs is associated with a particular operating condition of a channel. The postcoder is configured to select one of the plurality of LUTs based on a correspondence between a current operating condition of the channel and the particular operating condition of the selected LUT. The postcoder uses the selected LUT to convert the channel domain information to the user domain information.

In some implementations, the one or more LUTs comprise a plurality of LUTs, each LUT of the plurality of LUTs associated with a particular data track position on a rotating storage medium. The postcoder is configured to select one of the plurality of LUTs based on a correspondence between a current data track position and the particular data track position of the selected LUT. The postcoder uses the selected LUT to convert the channel domain information to the user domain information.

The detector/decoder may include a soft output Viterbi algorithm (SOVA) operating on register exchange architecture. In some particular embodiments, first stage includes: an add-compare-select (ACS) unit configured to determine most likely branches and path metric differences for each state of the trellis; an ACS first-in-first-out (FIFO) shift register coupled to the ACS unit and configured to store the most likely branches; and a path metric difference (PMD) FIFO shift register coupled to the ACS unit and configured to store the path metric differences. The second stage includes: a postcoder register exchange path equivalence detector (REAEQ) coupled to receive the most likely branches from the ACS FIFO, to assign user bit labels to each of the most likely branches, and to transfer the user-bit-labeled most likely branches to the third stage; and a postcoder reliability measurement unit (RMU) coupled to receive the path metric differences from the PMD FIFO, to assign user bit labels to each of the path metric differences, and to transfer the user-bit labeled path metric differences to the third stage. The third stage includes: a register exchange path equivalence detector (REAEQ) configured to receive the user-bit-labeled most likely branches from the postcoder REAEQ and to determine an equivalence between each pair of competing most likely branches; and a reliability measure unit (RMU) configured to receive the user-bit-labeled path metric differences and to determine a minimum difference in competing path metrics differences.

Some embodiments are directed to a communication system. The communication system includes an encoder configured to receive user bits from a host, to encode the user bits and to output encoded user bits. A precoder is configured to convert the encoded user bits to channel bits. A detector is configured to receive the channel bits from a storage medium. The detector includes first, second, and third stages. The first stage is configured to input channel data bits and to output hard data bits based on the channel bits and a maximum likelihood (ML) path estimation through a trellis. The second stage includes a postcoder coupled to receive channel domain information from the first stage and to convert the channel domain information to user domain information. The third stage comprises a reliability unit coupled to receive the user domain information from the postcoder and to output user domain soft information for the hard data bits based on the ML path estimation and the user domain information. The communication system further includes a decoder configured to receive the hard data bits and the soft information, and to decode the hard data bits using the soft information.

For example, the first stage can operate on a trellis of length L, the second stage can operate on a trellis of length GP, and the third stage can operate on a trellis of length M. In this scenario, the detector has a total latency of L+GP+M.

According to some aspects, the encoder comprises an LDPC encoder and the decoder comprises an LDPC decoder.

In some configurations, the postcoder includes one or more programmable postcoder look up tables (LUTs). Each postcoder LUT stores a map between channel bits in the channel domain and user bits in the user domain. For example, the one or more LUTs may comprise a plurality of LUTs, each LUT of the plurality of LUTs associated with a particular operating condition of a channel. The postcoder is configured to select one of the plurality of LUTs based on a correspondence between a current operating condition of the channel and the particular operating condition of the selected LUT. The postcoder uses the selected LUT to convert the channel domain information to the user domain information.

In some configurations, the precoder includes one or more programmable precoder look up tables (LUTs), each precoder LUT storing a map between user bits in the user domain and channel bits in the channel domain.

The precoder performs a mapping operation and the postcoder performs a reverse of the mapping operation. For example, the mapping operation performed by the precoder comprises mapping user bits to channel bits and the reverse mapping operation performed by the postcoder comprises mapping channel bits to user bits.

Some embodiments involve a communication method. Channel bits are received and are used to determine a maximum likelihood (ML) estimation. Hard data bits are determined based on the ML estimation. Channel domain most likely branches and channel domain path metric differences are determined for states along the most likely path. The channel domain most likely branches are converted to user domain most likely branches. The channel domain path metric differences are converted to user domain path metric differences. Soft information comprising reliability of the hard data bits is determined based on the user domain most likely branches and the user domain path metric differences.

Determining the hard data bits based on the ML estimation is implemented in a first stage operating on a trellis of length L. Converting the channel domain most likely branches to user domain most likely branches and converting channel domain path metric differences to user domain path metric differences is implemented in a second stage operating on a trellis of length GP. Determining the soft information is implemented in the third stage operating on a trellis of length M.

In some embodiments, converting the channel domain most likely branches to user domain most likely branches and converting channel domain path metric differences to user domain path metric differences comprises using one or more programmable look up tables (LUTs), each LUT storing a map between channel bits in the channel domain and user bits in the user domain. For example, the one or more LUTs comprise a plurality of LUTs, each LUT of the plurality of LUTs associated with a particular operating condition of a channel. The method further comprises selecting one of the plurality of LUTs based on a correspondence between a current operation condition of the channel and the particular operating condition of the selected LUT. The selected LUT is used to convert the channel domain most likely branches to user domain most likely branches and converting channel domain path metric differences to user domain path metric differences.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A signal detector, comprising:
a first stage configured to input channel data bits and to output hard data bits based on the channel data bits and a maximum likelihood (ML) path;
a second stage comprising a postcoder coupled to receive channel domain information from the first stage and to convert the channel domain information to user domain information; and
a third stage comprising a reliability unit coupled to receive the user domain information from the postcoder and to output user domain soft information for the hard data bits based on the ML path estimation and the user domain information.

2. The detector of claim 1, wherein:
the first stage operates on a trellis of length L;
the second stage operates on a trellis of length GP;
the third stage operates on a trellis of length M; and
the detector has a total latency of L+GP+M.

3. The detector of claim 1, wherein the postcoder includes one or more programmable look up tables (LUTs), each LUT storing a map between channel bits in the channel domain and user bits in the user domain.

4. The detector of claim 3, wherein:
the one or more LUTs comprise a plurality of LUTs, each LUT of the plurality of LUTs associated with a particular operating condition of a channel; and
the postcoder is configured to select one of the plurality of LUTs based on a correspondence between a current operating condition of the channel and the particular operating condition of the selected LUT, and to use the selected LUT to convert the channel domain information to the user domain information.

5. The detector of claim 3, wherein:
the one or more LUTs comprise a plurality of LUTs, each LUT of the plurality of LUTs associated with a particular data track position on a rotating storage medium; and
the postcoder is configured to select one of the plurality of LUTs based on a correspondence between a current data track position and the particular data track position of the selected LUT, and to use the selected LUT to convert the channel domain information to the user domain information.

6. The detector of claim 1, wherein the postcoder is a non-polynomial postcoder.

7. The detector of claim 1, wherein:
the first stage comprises:
an add-compare-select (ACS) unit configured to determine most likely branches and path metric differences for each state of the trellis;
an ACS first-in-first-out (FIFO) shift register coupled to the ACS unit and configured to store the most likely branches; and
a path metric difference (PMD) FIFO shift register coupled to the ACS unit and configured to store the path metric differences;
the second stage comprises:
a postcoder register exchange path equivalence detector (REAEQ) coupled to receive the most likely branches from the ACS FIFO, to assign user bit labels to each of the most likely branches, and to transfer the user-bit-labeled most likely branches to the third stage; and
a postcoder reliability measurement unit (RMU) coupled to receive the path metric differences from the PMD FIFO, to assign user bit labels to each of the path metric differences, and to transfer the user-bit labeled path metric differences to the third stage; and
the third stage comprises:
a register exchange path equivalence detector (REAEQ) configured to receive the user-bit-labeled most likely branches from the postcoder REAEQ and to determine an equivalence between each pair of competing most likely branches; and
a reliability measure unit (RMU) configured to receive the user-bit-labeled path metric differences and to determine a minimum difference in competing path metrics differences.

8. The detector of claim 1, wherein the detector comprises a soft output Viterbi algorithm (SOVA) operating on register exchange architecture.

9. A system, comprising:
an encoder configured to receive user bits from a host and to output encoded user bits;

a precoder configured to convert the encoded user bits to channel bits;

a detector configured to receive the channel bits, the detector comprising:

a module configured to receive channel data bits and to output hard data bits based on the channel bits and a maximum likelihood (ML) path estimation through a trellis; and a postcoder coupled to receive channel domain information from the module and to convert the channel domain information to user domain information; and a reliability unit coupled to receive the user domain information from the postcoder and to output user domain soft information for the hard data bits based on the ML path estimation and the user domain information; and a decoder configured to receive the hard data bits and the soft information and to decode the hard data bits using the soft information.

10. The system of claim 9, wherein:

the encoder comprises an LDPC encoder; and the decoder comprises an LDPC decoder.

11. The system of claim 9, wherein:

the module operates on a trellis of length L;

the postcoder operates on a trellis of length GP;

the reliability unit operates on a trellis of length M; and the detector has a total latency of L+GP+M.

12. The system of claim 9, wherein the postcoder includes one or more programmable postcoder look up tables (LUTs), each postcoder LUT storing a map between channel bits in the channel domain and user bits in the user domain.

13. The system of claim 12, wherein:

the one or more LUTs comprise a plurality of LUTs, each LUT of the plurality of LUTs associated with a particular operating condition of a channel; and the postcoder is configured to select one of the plurality of LUTs based on a correspondence between a current operating condition of the channel and the particular operating condition of the selected LUT, and to use the selected LUT to convert the channel domain information to the user domain information.

14. The system of claim 9, wherein the precoder includes one or more programmable precoder look up tables (LUTs), each precoder LUT storing a map between user bits in the user domain and channel bits in the channel domain.

15. The system of claim 9, wherein the precoder performs a mapping operation and the postcoder performs a reverse of the mapping operation.

16. The detector of claim 9, wherein the detector comprises a soft output Viterbi algorithm (SOVA) operating on register exchange architecture.

17. A method, comprising:

determining a maximum likelihood (ML) estimation based on channel data bits;

determining channel domain most likely branches and channel domain path metric differences for states along the most likely path of the ML estimation;

converting the channel domain most likely branches and path metric differences to user domain most likely branches and path metric differences of the ML estimation;

determining hard data bits based on the most likely path; and determining soft information comprising reliability of the hard data bits based on the user domain most likely branches and the user domain path metric differences.

18. The method of claim 17, wherein:

determining the hard data bits based on the most likely path is implemented in a first stage operating on a trellis of length L;

converting the channel domain most likely branches to the user domain most likely branches and converting the channel domain path metric differences to the user domain path metric differences is implemented in a second stage operating on a trellis of length GP;

determining the soft information is implemented in a third stage operating on a trellis of length M.

19. The method of claim 17, wherein converting the channel domain most likely branches to the user domain most likely branches and converting the channel domain path metric differences to the user domain path metric differences comprises using one or more programmable look up tables (LUTs), each LUT storing a map between channel bits in the channel domain and user bits in the user domain.

20. The method of claim 17, wherein:

the one or more LUTs comprise a plurality of LUTs, each LUT of the plurality of LUTs associated with a particular operating condition of a channel; and further comprising:

selecting one of the plurality of LUTs based on a correspondence between a current operation condition of the channel and the particular operating condition of the selected LUT; and using the selected LUT to convert the channel domain most likely branches to user domain most likely branches and converting channel domain path metric differences to user domain path metric differences.

* * * * *